(12) United States Patent
Benesh et al.

(10) Patent No.: US 12,276,861 B2
(45) Date of Patent: Apr. 15, 2025

(54) EYEPIECE FOR NIGHT VISION DEVICES CAPABLE OF INJECTING A SYNTHETIC IMAGE WITH A SINGLE OPTICAL CORRECTION MECHANISM

(71) Applicant: Elbit Systems Ltd., Haifa (IL)

(72) Inventors: Gil Benesh, Haifa (IL); Sharon Golebowicz, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 18/611,920

(22) Filed: Mar. 21, 2024

(65) Prior Publication Data

US 2024/0231036 A1 Jul. 11, 2024

Related U.S. Application Data

(63) Continuation of application No. 18/330,489, filed on Jun. 7, 2023, which is a continuation of application No. PCT/IL2021/051474, filed on Dec. 9, 2021.

(30) Foreign Application Priority Data

Dec. 9, 2020 (IL) .......................................... 279343

(51) Int. Cl.
*G02B 7/06* (2021.01)
*G02B 23/12* (2006.01)
(Continued)

(52) U.S. Cl.
CPC .............. *G02B 7/06* (2013.01); *G02B 23/12* (2013.01); *G02B 25/001* (2013.01);
(Continued)

(58) Field of Classification Search
None
See application file for complete search history.

(56) References Cited

U.S. PATENT DOCUMENTS 4,915,487 A 4/1990 Riddell, III et al.
5,444,568 A 8/1995 Williams, Jr. et al.
(Continued)

FOREIGN PATENT DOCUMENTS

WO WO 2019/233794 12/2019

*Primary Examiner* — Christopher Braniff
(74) *Attorney, Agent, or Firm* — PEARL COHEN ZEDEK LATZER BARATZ LLP

(57) ABSTRACT

An eyepiece suitable for a night vision device, having an optical combiner for injecting a synthetic image onto the scene and having a single optical correction mechanism is provided herein. The eyepiece may include an observer-side lens; an objective-side lens; a diopter adjustment knob configured to set a distance between the observer-side lens and the objective-side lens; and an optical combiner located between the objective-side lens and the objective-side lens, wherein the optical combiner reflects towards the observer-side lens, the synthetic image transmitted from outside the eyepiece and transfers towards the observer-side lens, a scene image coming from an objecting lens of the night vision device and passing through the objective side lens, and wherein the diopter adjustment knob serves as a single setting mechanism which simultaneously sets a diopter of the observer and a focal depth of the display source image.

14 Claims, 3 Drawing Sheets

(51) Int. Cl.
*G02B 25/00* (2006.01)
*G02B 27/01* (2006.01)
*G06F 3/14* (2006.01)
*H04N 5/77* (2006.01)

(52) U.S. Cl.
CPC ........... *G02B 27/0101* (2013.01); *G06F 3/14* (2013.01); *H04N 5/77* (2013.01); *G02B 2027/0112* (2013.01); *G02B 2027/0132* (2013.01); *G02B 2027/0138* (2013.01)

(56) References Cited

U.S. PATENT DOCUMENTS

| | | | |
|---|---|---|---|
| 6,061,182 A | 5/2000 | Carmeli et al. | |
| 7,586,686 B1 | 9/2009 | Hall | |
| 9,148,579 B1* | 9/2015 | Schwartz | G02B 27/017 |
| 2014/0226214 A1 | 8/2014 | Edwards et al. | |
| 2016/0028970 A1* | 1/2016 | Masarik | F41G 1/38 |
| | | | 348/341 |
| 2018/0224241 A1 | 8/2018 | Havens et al. | |

* cited by examiner

EYEPIECE FOR NIGHT VISION DEVICES CAPABLE OF INJECTING A SYNTHETIC IMAGE WITH A SINGLE OPTICAL CORRECTION MECHANISM

CROSS REFERENCE TO RELATED APPLICATIONS

This Application is a continuation of U.S. patent application Ser. No. 18/330,489 filed on Jun. 7, 2023, which is a Continuation of PCT Application No. PCT/IL2021/051474 filed on Dec. 9, 2021, which claims the priority of Israeli Patent Application No. 279343 filed on Dec. 9, 2020, all of which are incorporated herein by reference in their entireties.

FIELD OF THE INVENTION

The present invention relates to optical instruments and more particularly, to optical instruments for projecting synthetic data into vision instruments and in particular night vision instruments.

BACKGROUND OF THE INVENTION

Optical instruments for human observers (viewers), referred herein as vision devices, require sometimes the ability to provide synthetic information to be overlaid upon the image of the scene. The synthetic information may include an aiming reticle, azimuth, landmarks, battery level and the like. The synthetic data may include platform data in general, whether human, vehicle or flying platform. In more advanced applications, the synthetic data may be objects related to the scene that need alignment and conformity with the scene.

Currently, overlaying synthetic data on vision devices may be achieved by several techniques. In one known technique, the synthetic data is projected onto the optical instrument via a combiner to the image plane between the objective and the eyepiece using appropriate optical techniques. In another technique, a pattern (e.g., a reticle for aiming) is embedded on a transparent glass plate. Then, as the glass has the ability to be shifted by an adjusting mechanism, an image of the pattern is controlled by the observer.

All of the aforementioned techniques usually involve complicated optics, mainly lenses and mirrors, that are required for generating an accurate overlay of the synthetic data upon the formed image, taking into consideration optical effects such as aberrations.

Any optical instrument used by an observer has two sets of optical adjustment mechanisms. The first one allows focusing the image plane (e.g., the objective) and the second one (usually implemented on the eyepiece) allows correcting the vision of the observers whether they are near-sighted or far-sighted (e.g., diopter setting).

Night vision instrument usually uses an image intensifier behind the objective lens. The image of the scene, created by the objective lens and the image intensifier is then projected off a curved surface—also known as a "phosphor plate". This requires a use of a specific eye piece tailored for the use of night vision instruments which complies with a military standard.

Therefore, designing a night optical instrument with a synthetic image injected into the image plane of the objective and synchronized with the diopter setting of the eyepiece is challenging and having two distinct mechanisms for correcting the image (one for focus, one for correcting observer's vision) may result in a complicated optical design.

Such complicated design may include, for example, using a waveguide or a combiner in front and separated from the night visions system and requires two synchronized subsystems, one built-in setting of the night vision system and one for display waveguide or the combiner.

BRIEF SUMMARY OF THE INVENTION

In order to address the aforementioned challenges of the prior art, it has been suggested by the optical arrangement according to some embodiments of the present invention to provide an optical mechanism that simultaneously corrects the two systems (night vision and synthetic data) in accordance with the human observers' optical prescription.

Some embodiments of the present invention provide an eyepiece, preferably suitable for night vision optical instrument, with an optical combiner inserted within the eyepiece for combining a synthetic image onto the image coming from the scene. The optical combiner is located within the system eyepiece.

In accordance with some embodiments of the present invention, an eyepiece optically suitable for a night vision device is provided herein. The eyepiece may include: an observer-side lens suitable to face an observer, an objective-side lens suitable to face an objective lens of said night vision device; a diopter adjustment knob configured to set a distance between the observer-side lens and the objective-side lens; and an optical combiner located between the observer-side lens and the objective-side lens, wherein a scene image coming through the objective lens of said night vision device, passes through the objective-side lens, the optical combiner and the observer-side lens, wherein a display source image coming from an electronic display is reflected from the optical combiner into the observer-side lens, wherein the optical combiner is configured to overlay the display source image on the scene image; and wherein the diopter adjustment knob serves as a single setting mechanism which simultaneously sets a diopter of the observer and a focal depth of the display source image.

Advantageously, by having the combiner inserted within the eyepiece and not between the eyepiece and the objective lens of the night vision device as commonly implemented, an optical correction can be applied by a single set of lenses as opposed to two set of optical correction lenses.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
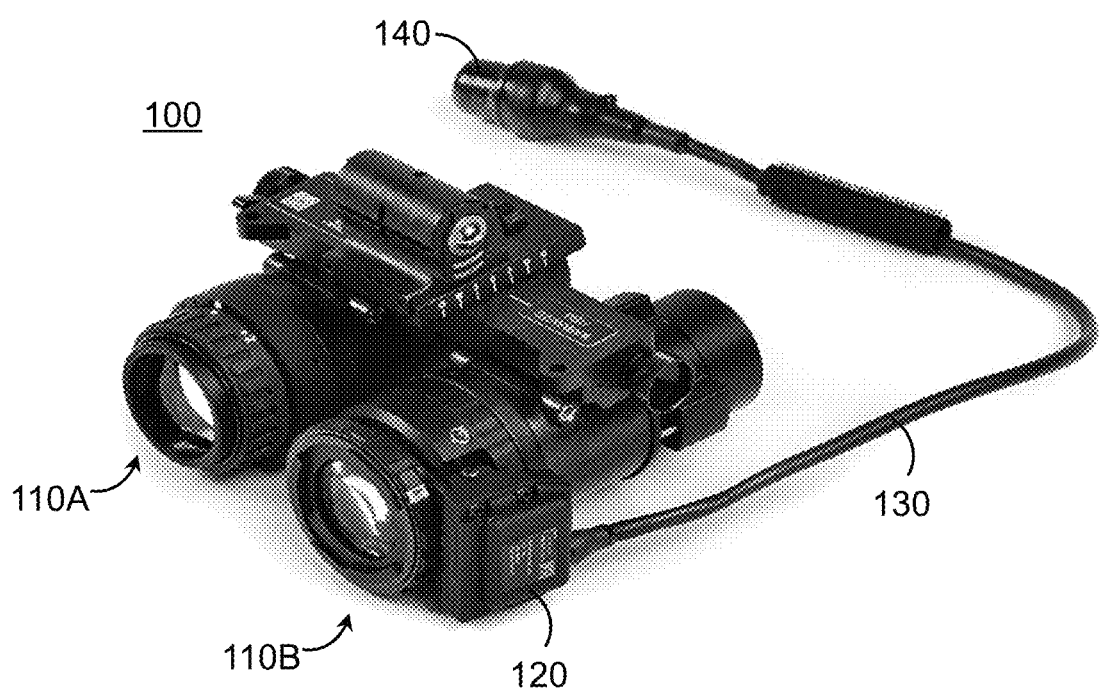
FIG. 1 is a schematic diagram illustrating schematic optical instrument with the eyepiece according to embodiments of the present invention.

The drawings together with the following detailed description make apparent to those skilled in the art how the invention may be embodied in practice.

DETAILED DESCRIPTION OF THE INVENTION

With specific reference now to the drawings in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a schematic diagram illustrating an optical instrument 100 with one eyepiece 110B according to embodiments of the present invention and one standard eyepiece 110A. Eyepiece 110B is equipped with an optical combiner for injecting a synthetic image generated by an electronic display 120 onto the scene. Electronic display 120 is external to eyepiece 110B and may be fed by a power source such as battery 140 via cable 130.

Figure 2:
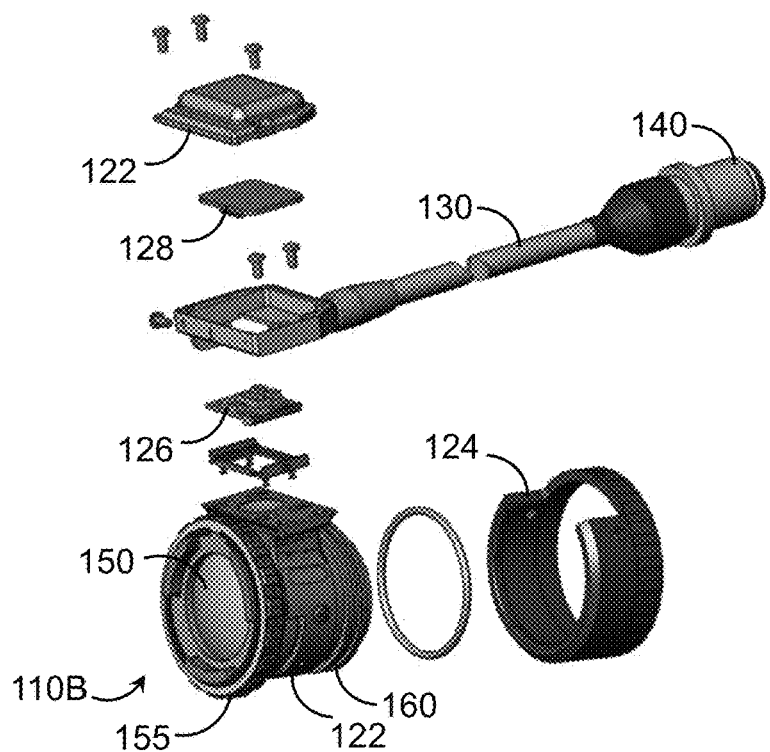
FIG. 2 is an exploded view diagram illustrating the eyepiece in accordance with embodiments of the present invention.

FIG. 2 is an exploded view diagram illustrating eyepiece 110B in accordance with some embodiments of the present invention. Eyepiece 110B may include: an observer-side lens 150 suitable to face an observer (not shown here); an objective-side lens 160 (obscured) suitable to face an objective lens of a night vision device (not shown here). Eyepiece 110B may further include a diopter adjustment knob 155 configured to set a distance between observer-side lens 150 and the objective-side lens 160 by mechanical means known in the art.

According to some embodiments of the invention, eyepiece 110B may further include an optical combiner 122 located between observer-side lens 150 and objective-side lens 160, wherein a scene image (not shown here) coming through the objective lens of said night vision device, passes through objective-side lens 160, optical combiner 122 and observer-side lens 150, wherein a display source image (not shown here) coming from electronic display 120 may be reflected from optical combiner 122 into observer-side lens 150, wherein optical combiner 122 may be configured to overlay the display source image on the scene image.

According to some embodiments of the invention, diopter adjustment knob 155 serves as a single setting mechanism which simultaneously sets a diopter of the observer and a focal depth of the display source image.

According to some embodiments of the invention various components of electronic display 120 may include a liquid crystal display (LCD) 126, backlight unit 128 and casing 122. Power source 140 feeds the backlight and the LCD via cable 130. Mechanically, coupling means 124 connects eyepiece 110B to the objective side of the optical instrument (not shown).

Figure 3:
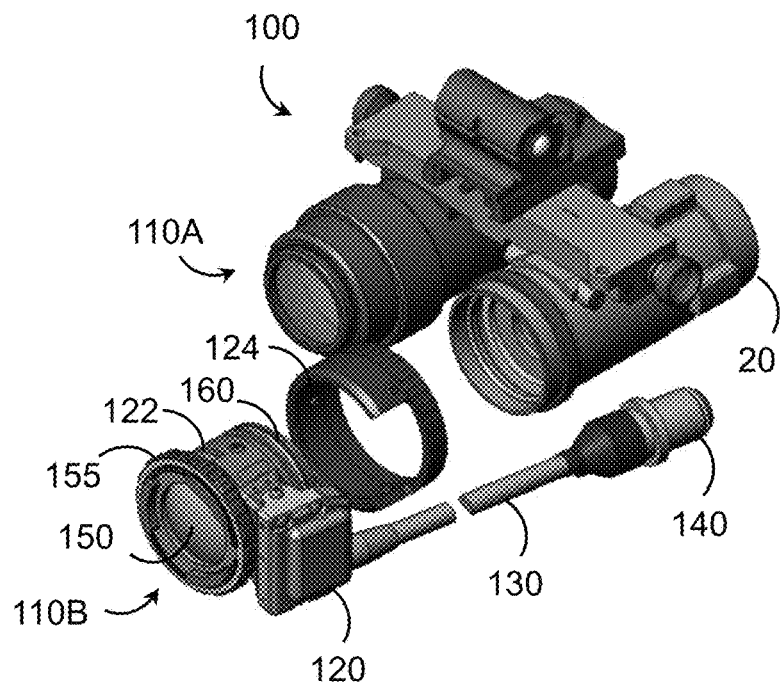
FIG. 3 is a diagram illustrating the eyepiece and the optical instrument in accordance with embodiments of the present invention.

FIG. 3 is a diagram illustrating another aspect of the eyepiece and the optical instrument in accordance with embodiments of the present invention. As shown, all of the above elements referred to in FIG. 2 are shown here in compact form. Additionally, an optical instrument 100 together with a standard eyepiece 110A are shown and serve as the environment of eyepiece 110B. Optical instrument 100 may include an objective lens 20 which in a case of a night vision device may include an image intensifier (not shown here) which generates, at its image plane, a night vision image of the scene (the aforementioned scene image) which is transmitted off the image intensifier to objective-side lens 160 of eyepiece 110B. While an image scene is monochromatic, placing optical combiner 120 between objective-side lens 160 and observer-side lens 150 allows using an electronic display 120 which generates a multi-colored display source image.

Figure 4:
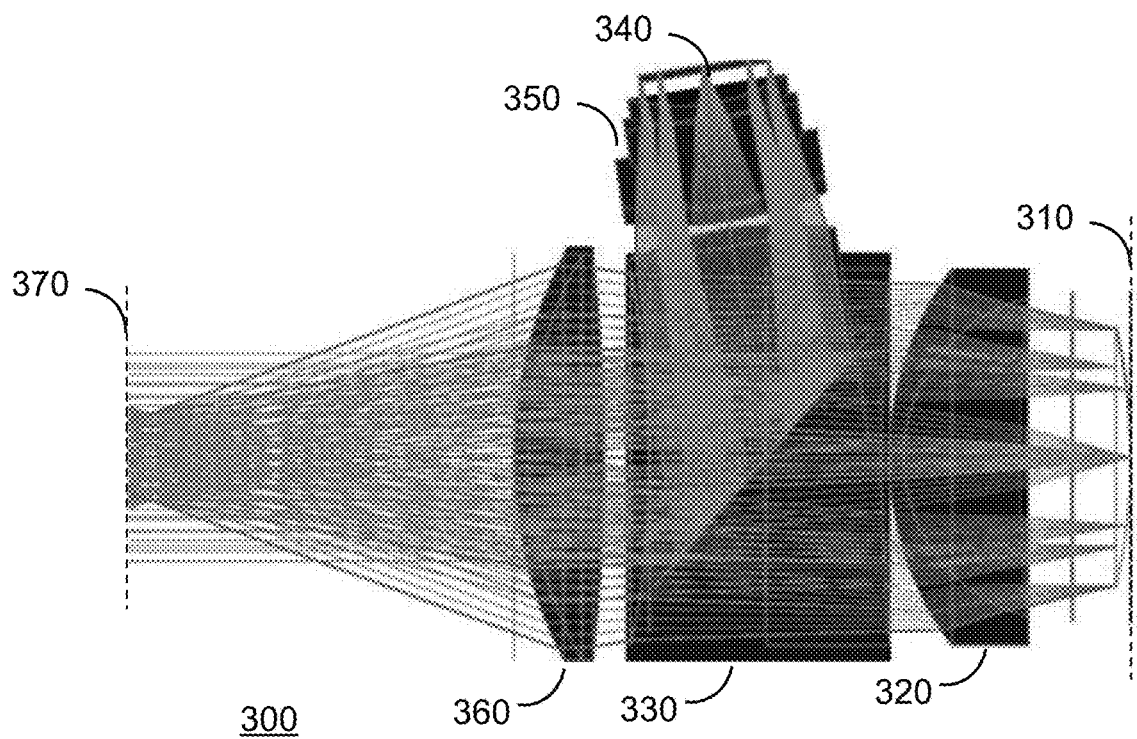
FIG. 4 is an optical diagram illustrating the optical arrangement in accordance with embodiments of the present invention.

FIG. 4 is an optical diagram illustrating the optical arrangement in accordance with embodiments of the present invention. Eyepiece 300 may include an observer-side lens 360; an objective-side lens 320; and an optical combiner 330 located between the observer-side lens 360 and the objective-side lens 320, wherein the optical combiner 330 reflects towards the observer-side lens 360 an image transmitted from outside the eyepiece, possibly originating from synthetic source such as electronic display having a source image plane 340 and further transfers via optics 350 towards the observer-side lens 360 an scene image coming from objective side lens 320 and transmitted off scene image plane 310. The distance between observer-side lens 360 and objective-side lens 320 may be adjusted mechanically and controlled by a diopter adjustment knob or ring (not shown here). The diopter adjustment knob allows observer-side lens 360 to move relative to objective-side lens 320 such that the distance between them changes the diopter settings. The diopter adjustment knob has a range of movement to accommodate various diopter setting from approximately −2 to +6.

In accordance with some embodiments of the present invention, by moving objective-side lens 320 to and from objective-side lens 320, two requirements are met: first, the observer's personal diopter setting is addressed so as to correct his or her vision of the scene image transmitted off image plane 310; and second, the synthetic image transmitted off image plane 340 is placed in the correct distance.

In accordance with some embodiments of the present invention, eyepiece 110B is optically suitable and designed for coupling to a night vision optical instrument.

In accordance with some embodiments of the present invention, eyepiece 110B may comply with a military standard for eyepieces designed for night vision optical instruments.

In accordance with some embodiments of the present invention, eyepiece 110B may further include an electronic display which is located external to eyepiece 110B and optically coupled to the optical combiner and configured to generate a display source image (synthetic image).

In accordance with some embodiments of the present invention, the electronic display is configured to generate multi-colors display source image so that multi-color synthetic image may be overlaid upon the monochromatic night vision scene image.

Figure 5:
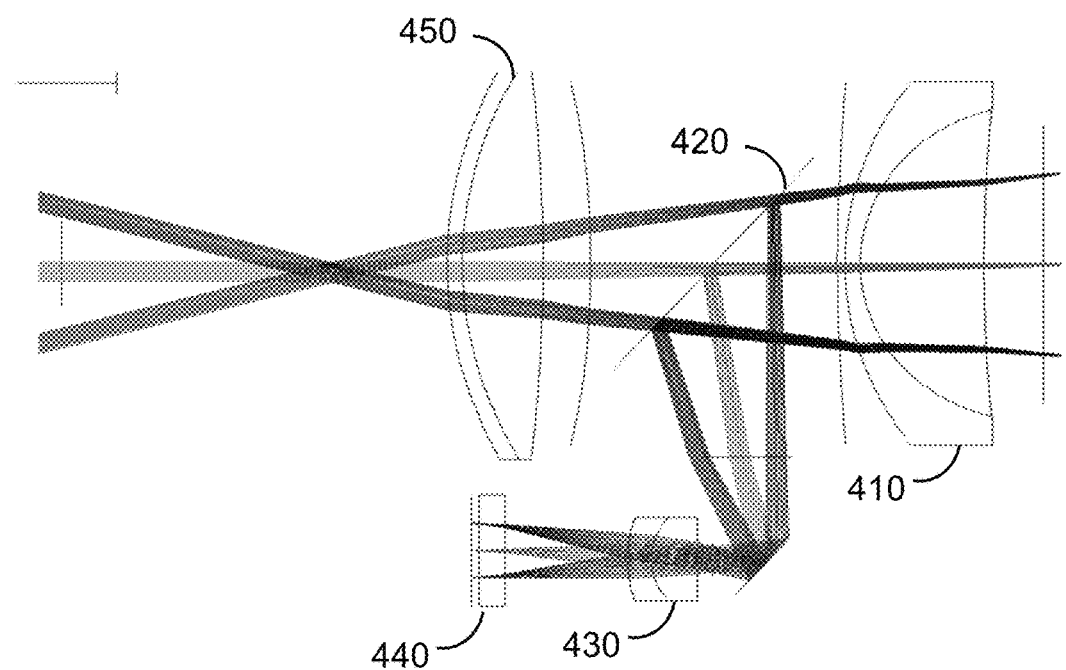
FIG. 5 is an optical diagram illustrating another use in which the optical arrangement is used for recording the scene, according to some embodiments of the present invention.

FIG. 5 is an optical diagram illustrating another aspect according to some embodiments of the present invention. Here objective-side lens 410 and observer-side lens 450 have an optical combiner 420 between them. Additionally, an image sensor 440 can be used for recording the image scene as coming through the objective-side lens 410, reflected by optical combiner 420 and passing through optics 430 while at the same time, the observer can uninterruptedly see the same scene image. This embodiment is implemented using the same eyepiece as illustrated above, with the electronic display replaces with an image sensor, thereby supporting another use case for the suggested eyepiece.

In accordance with some embodiments of the present invention, eyepiece 110B may further include an image sensor external to eyepiece 110B, optically coupled to the optical combiner, wherein the image sensor is configured to capture the scene image.

In accordance with some embodiments of the present invention, eyepiece 110B may further include a video recorder configured to record images captured by the image sensor.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment", or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting of" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference should not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. An eyepiece optically suitable for a night vision device, the eyepiece comprising:
   an observer-side lens suitable to face an observer,
   an objective-side lens suitable to face an objective lens of said night vision device;
   a diopter adjustment knob configured to set a distance between the observer-side lens and the objective-side lens; and
   an optical combiner located between the observer-side lens and the objective-side lens,
   wherein a scene image coming through the objective lens of said night vision device, passes through the objective-side lens, the optical combiner and the observer-side lens,
   wherein a display source image coming from an electronic display is reflected from the optical combiner into the observer-side lens,
   wherein the optical combiner is configured to overlay the display source image on the scene image;
   wherein the diopter adjustment knob serves as a single setting mechanism which simultaneously sets a diopter of the observer and a focal depth of the display source image, and
   wherein the eyepiece is a standalone device which is connectable to a night vision device.

2. The eyepiece according to claim 1, wherein the eyepiece is optically suitable for coupling to a night vision optical instrument.

3. The eyepiece according to claim 1, wherein the eyepiece complies with a military standard for eyepieces for night vision optical instruments.

4. The eyepiece according to claim 1, further comprising the electronic display which is located external to the eyepiece and optically coupled to the optical combiner and configured to generate said display source image.

5. The eyepiece according to claim 1, wherein said electronic display is configured to generate multi-colors display source image.

6. The eyepiece according to claim 1, further comprising an image sensor external to the eyepiece, optically coupled to the optical combiner, wherein the image sensor is configured to capture the scene image.

7. The eyepiece according to claim 6, further comprising a video recorder configured to record images captured by the image sensor.

8. A night vision device comprising:
an objective lens;
an image intensifier located at an image plane of said objective lens and configured to generate a scene image from light coming through the objective lens;
an eyepiece optically suitable for said night vision device and coupled to the image intensifier, the eyepiece comprising:
an observer-side lens suitable to face an observer,
an objective-side lens suitable to face an objective lens of said night vision device;
a diopter adjustment knob configured to set a distance between the observer-side lens and the objective-side lens; and
an optical combiner located between the observer-side lens and the objective-side lens,
wherein the scene image coming through the objective lens of said night vision device, passes through the objective-side lens, the optical combiner and the observer-side lens,
wherein a display source image coming from an electronic display is reflected from the optical combiner into the observer-side lens,
wherein the optical combiner is configured to overlay the display source image on the scene image;
wherein the diopter adjustment knob serves as a single setting mechanism which simultaneously sets a diopter of the observer and a focal depth of the display source image, and
wherein the eyepiece is a standalone device which is separable from the night vision device.

9. The night vision device according to claim 8, wherein the eyepiece is optically suitable for coupling to a night vision optical instrument.

10. The night vision device according to claim 8, wherein the eyepiece complies with a military standard for eyepieces for night vision optical instruments.

11. The night vision device according to claim 8, further comprising the electronic display which is located external to the eyepiece and optically coupled to the optical combiner and configured to generate said display source image.

12. The night vision device according to claim 8, wherein said electronic display is configured to generate multi-colors display source image.

13. The night vision device according to claim 8, further comprising an image sensor external to the eyepiece, optically coupled to the optical combiner, wherein the image sensor is configured to capture the scene image.

14. The night vision device according to claim 13, further comprising a video recorder configured to record images captured by the image sensor.

* * * * *